United States Patent
Camp et al.

(10) Patent No.: US 9,170,943 B2
(45) Date of Patent: Oct. 27, 2015

(54) SELECTIVELY ENABLING WRITE CACHING IN A STORAGE SYSTEM BASED ON PERFORMANCE METRICS

(71) Applicant: INTERNATIONAL BUSINESS MACHINES CORPORATION, Armonk, NY (US)

(72) Inventors: Charles J. Camp, Sugar Land, TX (US); Roman Pletka, Uster (CH); Andrew D. Walls, San Jose, CA (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 173 days.

(21) Appl. No.: 14/013,780

(22) Filed: Aug. 29, 2013

(65) Prior Publication Data

US 2015/0067271 A1    Mar. 5, 2015

(51) Int. Cl.
*G06F 12/08* (2006.01)

(52) U.S. Cl.
CPC ........ *G06F 12/0804* (2013.01); *G06F 12/0888* (2013.01); *G06F 2212/603* (2013.01)

(58) Field of Classification Search
CPC ............ G06F 12/0866; G06F 12/0888; G06F 2212/222; G06F 2212/603; G06F 12/0891
See application file for complete search history.

(56) References Cited

U.S. PATENT DOCUMENTS

| | | | |
|---|---|---|---|
| 8,271,737 B2 | 9/2012 | Chen et al. | |
| 8,285,946 B2 | 10/2012 | Eleftheriou et al. | |
| 2004/0117441 A1* | 6/2004 | Liu et al. | 709/203 |
| 2009/0172286 A1* | 7/2009 | Lasser et al. | 711/127 |
| 2010/0274962 A1* | 10/2010 | Mosek et al. | 711/113 |
| 2012/0284587 A1 | 11/2012 | Yu et al. | |
| 2013/0145075 A1* | 6/2013 | Huang et al. | 711/103 |
| 2014/0089584 A1* | 3/2014 | Pan | 711/118 |
| 2015/0046648 A1* | 2/2015 | Anderson et al. | 711/118 |

FOREIGN PATENT DOCUMENTS

EP    1031992 A2    8/2000

OTHER PUBLICATIONS

Oh, Yongseok, et al. "Caching less for better performance: Balancing cache size and update cost of flash memory cache in hybrid storage systems." Proceedings of the 10th USENIX Conference on File and Storage Technologies (FAST). Feb. 2012.

* cited by examiner

*Primary Examiner* — Hal Schnee
(74) *Attorney, Agent, or Firm* — Catherine Ivers; Roberts Mlotkowski Safran & Cole, P.C.

(57) ABSTRACT

According to a method of cache management in a data storage system including a write cache and bulk storage media, a storage controller of the data storage system caches, in the write cache, write data of write input/output operations (IOPs) received at the storage controller. In response to a first performance-related metric for the data storage system satisfying a first threshold, the storage controller decreases a percentage of write IOPs for which write data is cached in the write cache of the data storage system and increases a percentage of write IOPs for which write data is stored directly in the bulk storage media in lieu of the write cache. In response to a second performance-related metric for the data storage system satisfying a second threshold, the storage controller increases the percentage of write IOPs for which write data is cached in the write cache of the data storage system.

18 Claims, 4 Drawing Sheets

SELECTIVELY ENABLING WRITE CACHING IN A STORAGE SYSTEM BASED ON PERFORMANCE METRICS

BACKGROUND OF THE INVENTION

The present invention relates to data storage, and more specifically, to data storage systems employing write caching.

Conventional data storage systems have employed write caches to improve write latency. For example, it is well known for a magnetic disk storage system to implement a write cache in Dynamic Random Access Memory (DRAM) because of the relatively low write latency of DRAM as compared to a magnetic disk drive, particularly for random (as opposed to sequential) addresses. In such embodiments, the disk storage system services a write command by storing the write data into the DRAM write cache and, if required, immediately signaling completion to the requester. The magnetic disk storage system thereafter destages the data from the DRAM write cache to magnetic disk drives, for example, during a period in which a relatively low number of access requests are received or due to capacity constraints in the DRAM write cache. In addition to reducing write latency, the DRAM write cache can reduce the overall amount of data written to the magnetic disk drives because data overwritten while held in the DRAM write cache is never written to the magnetic disk drives. Write caches have also been employed in data storage systems employing other bulk storage media, such as flash memory storage systems.

Management of write caches is often implemented in software rather than hardware due to the complexity of cache management operations and the flexibility provided by software implementation. The present invention recognizes that in software-managed write caches, each time an access request is received, a storage controller of the storage system must execute a sequence of instructions to perform a cache lookup to determine whether or not the target data block specified by the access request is held in the write cache. In the case of a write miss, the storage controller must additionally select a victim entry for eviction from the write cache and destage that victim entry from the write cache to the bulk storage if there is no free space in the write cache. In at least some designs, the processing performed by the storage processor to support use of the write cache can make the storage processor a critical resource under high request rates and reduce the rate at which the data storage system can service access requests.

BRIEF SUMMARY

In some embodiments, a method of cache management in a data storage system includes a storage controller of the data storage system caching, in a write cache of the data storage system, write data of write input/output operations (IOPs) received at the storage controller. In response to a first performance-related metric for the data storage system satisfying a first threshold, the storage controller decreases a percentage of write IOPs for which write data is cached in the write cache of the data storage system and increases a percentage of write IOPs for which write data is stored directly in bulk storage media of the data storage system in lieu of the write cache. Thereafter, in response to a second performance-related metric for the data storage system satisfying a second threshold, the storage controller increases the percentage of write IOPs for which write data is cached in the write cache of the data storage system.

DETAILED DESCRIPTION

Figure 1:
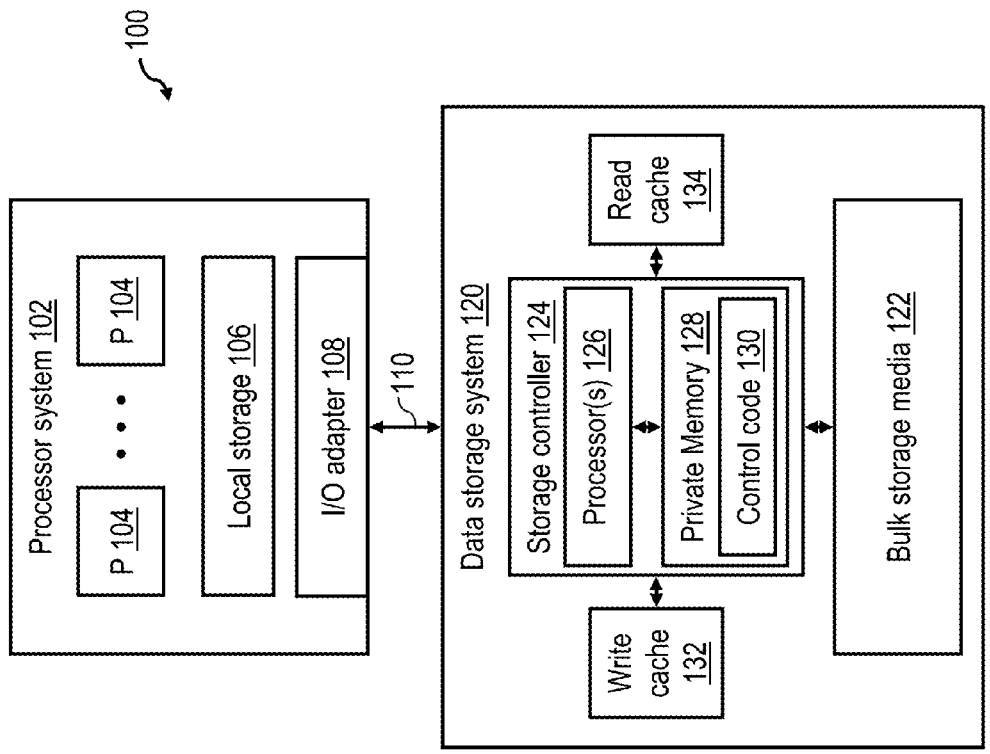
FIG. 1 is a high level block diagram of a data processing environment in accordance with one embodiment.

With reference now to the figures and with particular reference to FIG. 1, there is illustrated a high level block diagram of an exemplary data processing environment 100 including a data storage system that employs selective write caching, as described further herein. As shown, data processing environment 100 includes at least one processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone), a laptop or desktop personal computer system, a server computer system(such as one of the POWER series available from International Business Machines Corporation), or a mainframe computer system.

Processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel may employ any one or combination of known or future developed communication protocols, including, for example, Fibre Channel (FC), FC over Ethernet (FCoE), iSCSI, Transport Control Protocol/Internet Protocol (TCP/IP), etc.

Data storage system 120 includes bulk storage media 122, which typically provide a storage capacity much greater than the local storage 106 of processor system 102. Bulk storage media 122 is typically implemented with non-volatile storage media, such as magnetic disks, flash memory, phase change memory (PCM), etc. Depending on the size and configuration of the data storage system 120, bulk storage media 122 can be physically located fully or partially inside the same enclosure as the remainder of data storage system 120 or can be located externally in one or more separate enclosures. Read and write access to the contents of bulk storage media 122 by processor system 102 is controlled by a storage controller 124. In at least one embodiment, storage controller 124 implements software control of data storage system 120. Accordingly, FIG. 1 illustrates an embodiment of storage controller 124 that includes a private memory 128 storing control code 130, as well as one or more processors 126 that execute control code 130 from private memory 128 to control data storage system 120, and in particular, to implement selective write caching as disclosed herein.

Because the storage technology selected to implement bulk storage media 122 generally has a higher access latency than other available storage technologies, data storage system 120 preferably includes a lower latency write cache 132 that caches data written by processor system 102 to data storage system 120. Data storage system 120 may optionally further include a read cache 134 that caches data likely to be read from bulk storage media 122 by processor system 102. Write cache 132 and read cache 134 may be implemented, for example, in DRAM, SRAM, or PCM. As discussed below, storage controller 124 employs a software-managed write cache 132 to intelligently and selectively cache write data of write input/output operations (IOPs) received from processor system 102. By doing so, storage controller 124 ensures that write caching is implemented in a manner that improves (rather than diminishes) a desired performance metric of data storage system 120.

It should be noted that in some embodiments of data processing environment 100 more than one processor system 102 can access a single data storage system 120. Also, in some embodiments, data storage system 120 can be implemented as part of local storage 106. In yet other embodiments, storage controller 124 and write cache 132 of data storage system 120 can be implemented as part of local storage 106 and bulk storage media 122 can be externally attached via I/O channel 110.

Figure 2:
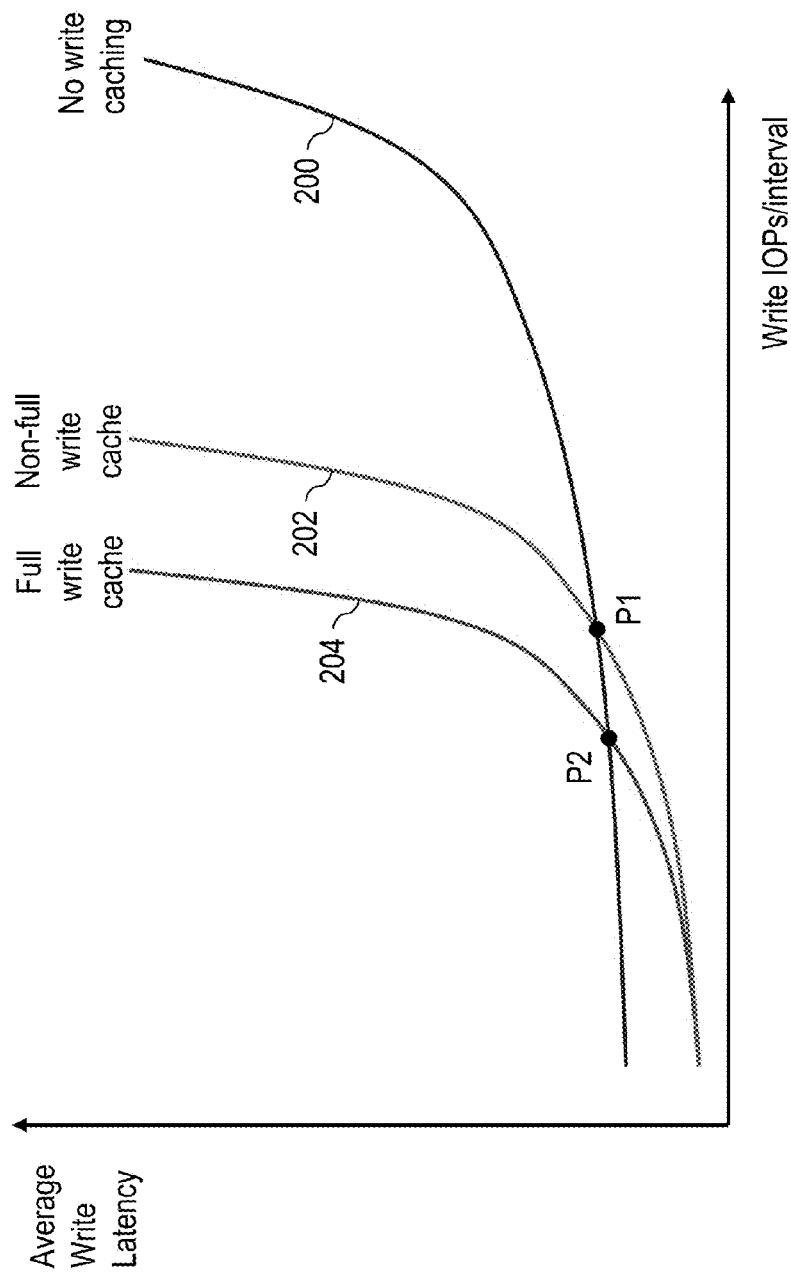
FIG. 2 is a diagram illustrating the write latency of a data storage system versus the rate of receipt of write input/output operations (IOPs) under various operating conditions.

Referring now to FIG. 2, there is depicted a diagram illustrating average write latency versus the rate of receipt of IOPs under various operating conditions in one embodiment of data storage system 120. Write latency is computed as the time interval between receipt by data storage system 120 of a write IOP from processor system 102 and transmission by data storage system 120 of an acknowledgement of completion of the write IOP to processor system 102.

In FIG. 2, curve 200 illustrates the average write latency of data storage system 120 for various rates of write IOPs when write caching using write cache 132 is not employed (i.e., write cache 132 is in an OFF state). As shown, the write latency, while somewhat high, is relatively constant over a broad range of write IOP rates and only increases slowly as the rate of receipt of write IOPs increases until the rate of write IOPs reaches an exceedingly high level. At that point, the write latency of data storage system 120 increases exponentially as the rate of receipt of write IOPs increases.

FIG. 2 additionally illustrates curve 202, which depicts the average write latency of data storage system 120 versus the rate of receipt of write IOPs when write caching is employed and write cache 132 is not full. Curve 202 demonstrates that, at low write IOPs rates, write caching substantially improves the write latency of data storage system 120 as compared to curve 200. This performance improvement is due to the fact that data storage system 120 can acknowledge a write IOP, completing the requested write access from the perspective of processor system 102, as soon as the write data of the write IOP is stored into write cache 132, which has a lower inherent access latency than bulk storage media 122. However, as the rate of receipt of IOPs increases, write caching can cause the write latency of data storage system 120 to degrade and, at point P1, to actually exceed that experienced if no write caching were employed. This phenomenon is attributable to the bottleneck created at processor(s) 126 by the execution of control code 130 to manage write cache 132, for example, by performing lookups for target addresses, selecting entries for eviction, managing the destaging of evicted entries to bulk storage media 122, etc.

As further shown in FIG. 2 by curve 204, when write cache 132 becomes full and consequently has no empty entries for storing additional write data, the degradation in write latency is exacerbated because control code 130 must be executed to select a victim entry for eviction and to destage the victim entry to bulk storage media 122 each time a miss occurs for a write IOP in write cache 132. Consequently, curve 204 intersects curve 200 at a point P2 having a lower write IOP rate than point P1 on curve 202.

In summary, FIG. 2 demonstrates that write caching is generally beneficial at low write IOP rates. However, as the write IOP rate increases, write latency increases until, at some point, write caching is no longer beneficial to (and actually degrades) write latency of data storage system 120.

Figure 3:
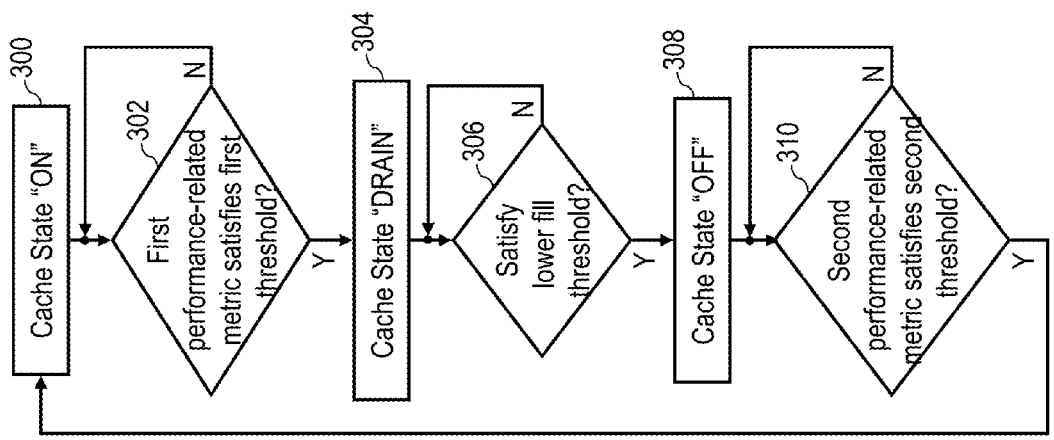
FIG. 3 is a high level flowchart of a first exemplary embodiment of a process for selectively enabling write caching in a data storage system.

With reference now to FIG. 3, there is illustrated a high level flowchart of a first exemplary embodiment of a process for selectively enabling write caching in a data storage system. The illustrated process can be performed, for example, by processor(s) 126 of storage controller 124 executing control code 130 to manage write caching by write cache 132 of data storage system 120.

The process begins at block 300, which illustrates storage controller 124 implementing write caching for the write data of write IOPs with write cache 132 in an ON state. That is, storage controller 124 stores write data specified by write IOPs received from processor system 102 in write cache 132 rather than in bulk storage media 122 and immediately acknowledges completion of the write IOP to processor system 102. While storage controller 124 implements write caching using write cache 132, storage controller 124 periodically computes and monitors one or more first performance-related metrics, which are each based on one or more criteria including, for example, a rate of receipt of write IOPs by storage controller 124 during a most recent monitoring interval, an average response time (ART) of data storage system 120 to read and/or write IOPs during the most recent monitoring interval, and/or a utilization of the processing capacity of processor(s) 126 during the most recent monitoring interval. Additional criteria can include, for example, the maximum response time (MRT) of data storage system 120 to read and/or write IOPs during the most recent monitoring interval, the standard deviation of response times in the most recent monitoring interval and/or the fill level of write cache 132. As indicated at block 302, storage controller 124 determines whether or not the first performance-related metric(s) satisfy one or more corresponding first thresholds. In some embodiments, this determination can include determining whether or not the first performance-related metric(s) exceed the corresponding first threshold(s). In alternative embodiments, the determination made at block 302 can include determining whether at least one of the one or more first performance-related metrics is equal to or less than the corresponding first threshold. In any case, the first threshold(s) is/are preferably selected to be at or near a point at which the write latency of data storage system 120 is equal to that if write caching were not employed (i.e., on or near curve 200 of FIG. 2 between points P1 and P2).

In response to a determination at block 302 that the one or more first performance-related metrics do not satisfy the corresponding first threshold(s), storage controller 124 maintains write cache 132 in the ON state, and the process shown in FIG. 3 iterates at block 302. If, however, storage controller 124 determines at block 302 that the one or more first performance-related metric(s) satisfy the corresponding first threshold(s), storage controller 124 updates write cache 132 to a DRAIN state at block 304. (It should be noted that in some embodiments, the first threshold(s) must be satisfied for multiple consecutive monitoring intervals or a majority of a set of consecutive monitoring intervals for storage controller 124 to update write cache 132 from the ON state to the DRAIN state.)

While write cache 132 is in the DRAIN state, storage controller 124 begins to destage the contents of write cache 132 to bulk storage media 122 (and invalidate the destaged entries in write cache 132) until write cache 132 reaches a lower fill threshold (for example, empty). While destaging the contents of write cache 132 in this manner, storage controller 124 will likely continue to receive write IOPs from processor system 102. For write IOPs specifying addresses that miss in write cache 132, storage controller 124 stores write data specified by the write IOPs directly to bulk storage media 122 rather than to write cache 132. For write IOPs specifying addresses that hit in write cache 132, storage controller 124 can be configured by control code 130 to either overwrite corresponding data in write cache 132 or to invalidate the matching entry in write cache 132 and store the write data directly to bulk storage media 122.

While write cache 132 is in the DRAIN state, storage controller 124 monitors the fill level of write cache 132 to determine whether or not the fill level of write cache 132 has decreased to the point that it satisfies the lower fill threshold (block 306). If not, storage controller 124 maintains write cache 132 in the DRAIN state and continues to destage the contents of write cache 132 to bulk storage media 122 (and invalidate the destaged entries). If, on the other hand, storage controller 124 determines at block 306 that the fill level of write cache 132 satisfies the lower fill threshold, storage controller 124 transitions write cache 132 from the DRAIN state to the OFF state at block 308. While write cache 132 is in the OFF state, storage controller 124 does not store write data of write IOPs in write cache 132, but instead stores the write data of any received write IOPs directly into bulk storage media 122. If write cache 132 was drained to empty (i.e., contains no valid entries) prior to entering the OFF state, storage controller 124 can advantageously omit executing the control code 130 to perform a lookup in write cache 132 for each write IOP received from processor system 102, thus further decreasing write latency. If write cache 132 was merely drained to a non-empty fill level prior to entered the OFF state, storage controller 124 must still perform such lookups to invalidate entries associated with addresses matching those specified by write IOPs received from processor system 102.

While write cache 132 is in the OFF state, storage controller 124 monitors one or more second performance-related metrics to determine whether or not one or more corresponding second thresholds is/are satisfied (block 310). In one embodiment, the second performance-related metric is solely the number of write IOPs received by storage controller 124 during a most recent monitoring interval, and the corresponding second threshold is a predetermined number of write IOPs (e.g., the number of write IOPs corresponding to point P1 in FIG. 2). In other embodiments, one or more additional criteria can be evaluated separately or in combination to make the determination at block 310. In response to a determination at block 310 that the one or more second performance-related metrics do not satisfy one or more corresponding second thresholds, storage controller 124 maintains write cache 132 in the OFF state and continues to monitor for satisfaction of the one or more second thresholds at block 310. In response to determining at block 310 that the one or more second thresholds are satisfied by the one or more second performance-related metrics, storage controller 124 returns write cache 132 to the ON state at block 300 and resumes write caching of the write data of write IOPs received from processor system 102.

Figure 4:
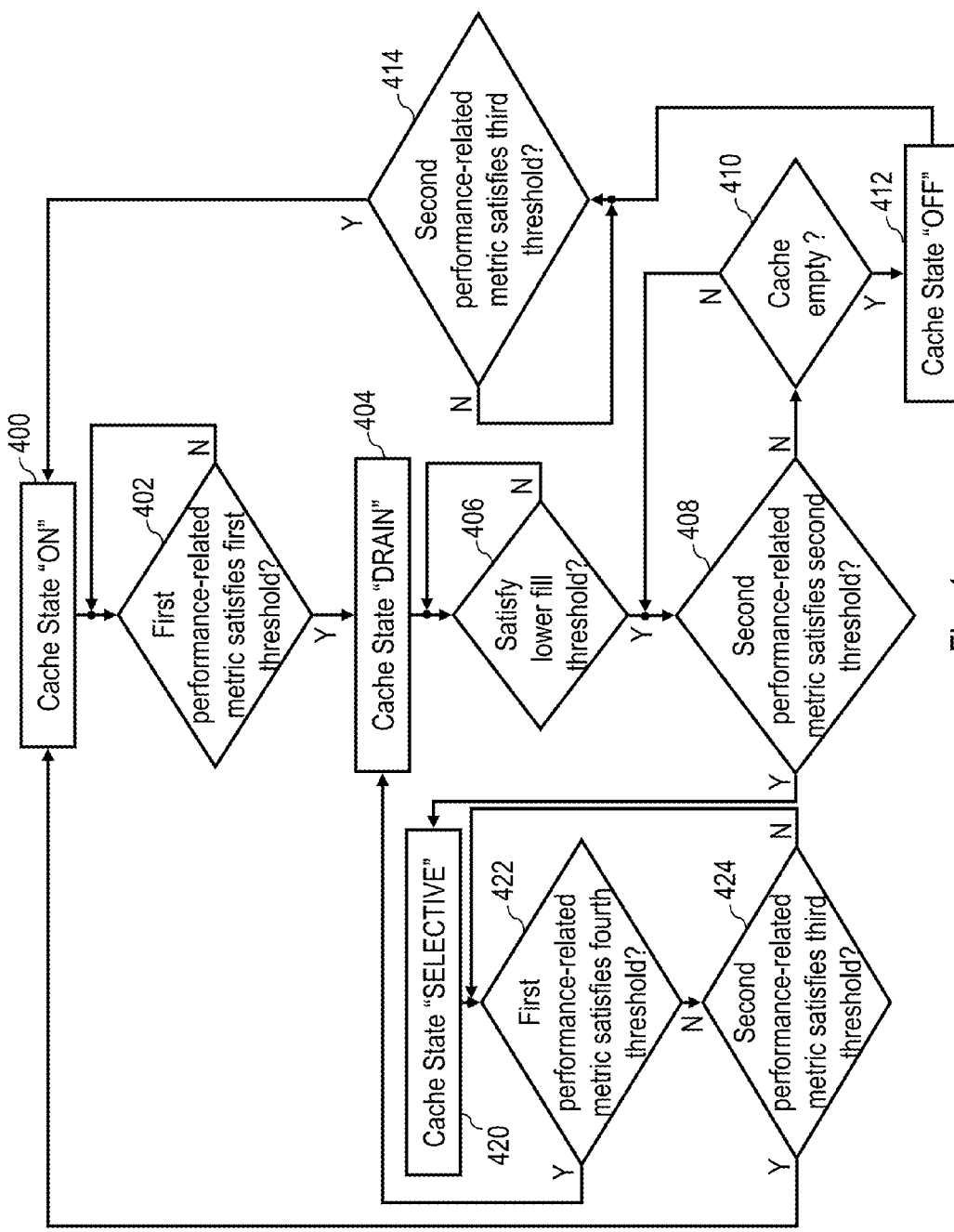
FIG. 4 is a high level flowchart of a second exemplary embodiment of a process for selectively enabling write caching in a data storage system.

Referring now to FIG. 4, there is depicted a high level flowchart of a second exemplary embodiment of a process for selectively enabling write caching in a data storage system. The illustrated process can be performed, for example, by processor(s) 126 of storage controller 124 executing control code 130 to manage write caching by write cache 132.

The process shown in FIG. 4 begins at block 400, which illustrates storage controller 124 implementing write caching for the write data of write IOPs with write cache 132 in an ON state. While storage controller 124 implements write caching using write cache 132, storage controller 124 periodically computes and monitors one or more first performance-related metrics, which are each based on one or more criteria including, for example, a rate of receipt of write IOPs by storage controller 124 during a most recent monitoring interval, an average response time (ART) of data storage system 120 to read and/or write IOPs during the most recent monitoring interval, and/or a utilization of the processing capacity of processor(s) 126 during the most recent monitoring interval. Additional criteria can include, for example, the maximum response time (MRT) of data storage system 120 to read and/or write IOPs during the most recent monitoring interval, the standard deviation of response times in the most recent monitoring interval and/or the fill level of write cache 132. As indicated at block 402, storage controller 124 determines whether or not the first performance-related metric(s) satisfy one or more corresponding first thresholds. In some embodiments, this determination can include determining whether or not the first performance-related metric(s) exceed the corresponding first threshold(s). In alternative embodiments, the determination made at block 402 can include determining whether at least one of the one or more first performance-related metrics is equal to or less than the corresponding first threshold. In either case, the first threshold(s) is/are preferably selected to be at or near a point at which the write latency of data storage system 120 is equal to that if write caching were not employed (i.e., on or near curve 200 of FIG. 2 between points P1 and P2).

In response to a determination at block 402 that the one or more first performance-related metrics do not satisfy the corresponding first threshold(s), storage controller 124 maintains write cache 132 in the ON state, and the process shown in FIG. 4 iterates at block 402. If, however, storage controller 124 determines at block 402 that the one or more first performance-related metrics has/have satisfied the corresponding first threshold(s), storage controller 124 updates write cache 132 to a DRAIN state at block 404. (It should be noted that in some embodiments, the first threshold(s) must be satisfied for multiple consecutive monitoring intervals or a majority of a set of consecutive monitoring intervals for storage controller 124 to update write cache 132 from the ON state to the DRAIN state.)

While write cache 132 is in the DRAIN state, storage controller 124 begins to destage the contents of write cache 132 to bulk storage media 122 (and invalidate the destaged entries in write cache 132) until write cache 132 reaches a lower fill threshold, which in the embodiment of FIG. 4 is preferably a fill level higher than empty. While destaging the contents of write cache 132 in this manner, storage controller 124 will likely continue to receive write IOPs from processor system 102. For write IOPs specifying addresses that miss in write cache 132, storage controller 124 stores write data specified the write IOP directly to bulk storage media 122 rather than to write cache 132. For write IOPs specifying addresses that hit in write cache 132, storage controller 124 can be configured by control code 130 to either overwrite corresponding data in write cache 132 or to invalidate the matching entry in write cache 132 and store the write data directly to bulk storage media 122.

While write cache 132 is in the DRAIN state, storage controller 124 monitors the fill level of write cache 132 to determine whether or not the fill level of write cache 132 satisfies the lower fill threshold (block 406). If not, storage controller 124 maintains write cache 132 in the DRAIN state and continues to destage (and invalidate) the contents of write cache 132. If, on the other hand, storage controller 124 determines at block 406 that the fill level of write cache 132 satisfies the lower fill threshold, storage controller 124 determines whether to update the state of write cache 132 to the previously described OFF state or to a SELECTIVE state in which write caching is employed for the write data of some but not all write IOPs. In the exemplary process of FIG. 4, storage controller 124 makes this determination via blocks 408 and 410.

As shown at blocks 408 and 410 (which may be performed in parallel), storage controller 124 determines whether write cache 132 first drains to empty or whether, prior to the write cache 132 draining to empty, a second performance-related metric satisfies a second threshold. For example, in one embodiment, the second performance-related metric is solely the number of write IOPs received by storage controller 124 during a most recent monitoring interval, and the corresponding second threshold is a predetermined number of write IOPs (e.g., a number corresponding to point P1 in FIG. 2). In other embodiments, one or more additional criteria can be evaluated separately or in combination to make the determination at block 410.

In response to storage controller 124 determining that write cache 132 has drained to empty prior to the second threshold being satisfied, storage controller 124 transitions write cache 132 from the DRAIN state to the OFF state at block 412. While write cache 132 is in the OFF state, storage controller 124 does not store write data of any write IOPs received from processor system 102 in write cache 132, but instead stores the write data directly in bulk storage media 122. Because write cache 132 was drained to empty (i.e., contained no valid entries) prior to entering the OFF state, storage controller 124 can advantageously omit executing the control code 130 utilized to direct a lookup in write cache 132 for each write IOP received from processor system 102, thus further decreasing write latency.

While write cache 132 is in the OFF state, storage controller 124 determines at block 414 whether or not the second performance-related metric (e.g., the number of write IOPs per monitoring interval) satisfies a third threshold, which preferably corresponds to lower rate of receipt of IOPs than the second threshold. In response to a determination at block 414 that the second performance-related metric does not satisfy the third threshold, storage controller 124 maintains write cache 132 in the OFF state and continues to monitor for satisfaction of the third threshold at block 414. In response to storage controller 124 determining at block 414 that the third threshold is satisfied by the second performance-related metric, storage controller 124 returns write cache 132 to the ON state at block 400 and resumes write caching of the write data of write IOPs received from processor system 102.

In response to storage controller 124 determining at blocks 408 and 410 that the second threshold is satisfied prior to the draining of write cache 132, storage controller 124 updates write cache 132 to the SELECTIVE state, which as noted above, is a state in which write cache 132 caches write data for some but not all write IOPs received by data storage system 124 from processor system 102. For example, while write cache 132 is in SELECTIVE state, storage controller 124 may direct write cache 132 to store write data of write IOPs that hit in write cache 132 and to refrain from caching write data of write IOPs that miss in write cache 132. Alternatively or additionally, store controller 124 may direct write cache 132 to cache write data associated with selected addresses, for example, addresses that are known to be frequently accessed (i.e., hot data). Storage controller 124 may alternatively or additionally determine whether implement write caching for a write IOP based on the current fill level of the write cache. If storage controller 124 opts not to cache write data of a write IOP that hits in write cache 132, then storage controller 124 invalidates the matching entry in write cache 132 to maintain data consistency.

While write cache 132 is in the SELECTIVE state, storage controller 124 monitors the one or more performance-criteria to determine whether or not to retain write cache 132 in the SELECTIVE state, to return write cache 132 to the DRAIN state, or to return write cache 132 to the ON state. In the exemplary embodiment given in FIG. 4, storage controller 124 determines the state of write cache 132 based on the outcome of determinations at blocks 422 and 424 (which may be performed concurrently) whether or not the one or more first performance related metrics satisfy one or more corresponding fourth thresholds (which may be the same as or be based on the same criteria as the first thresholds) and whether or not the second performance-related metric satisfies the third threshold. In response to storage controller 124 first determining at block 422 that the one or more first performance-related metrics satisfy the one or more corresponding fourth thresholds, indicating that write caching is not beneficial to performance, storage controller 124 returns write cache 132 to the DRAIN state at block 404. In response to storage controller 124 first determining at block 424 that the second performance-related metric satisfies the third threshold, indicating that write caching would again be beneficial to performance, storage controller 124 returns write cache 132 to the ON state at block 400. In response to storage controller 124 determining at blocks 422 and 424 that neither of the third or fourth thresholds is satisfied, storage controller 124 maintains write cache 132 in the SELECTIVE state.

As has been described, in some embodiments a method of cache management in a data storage system includes a storage controller of the data storage system caching, in a write cache of the data storage system, write data of write input/output operations (IOPs) received at the storage controller. In response to a first performance-related metric for the data storage system satisfying a first threshold, the storage controller decreases a percentage of write IOPs for which write data is cached in the write cache of the data storage system and increases a percentage of write IOPs for which write data is stored directly in bulk storage media of the data storage system in lieu of the write cache. In the embodiment of FIG. 3, decreasing the percentage of write IOPs for which write caching is performed and increasing the percentage of write IOPs for which write data is stored directly in bulk storage media is achieved by transitioning the write cache from the ON state to the DRAIN state and then to the OFF state. In other embodiments, such as that depicted in FIG. 4, this step can be performed by transitioning the write cache from the ON state to another state, such as the DRAIN state or SELECTIVE state. Thereafter, in response to a second performance-related metric for the data storage system satisfying a second threshold, the storage controller increases the percentage of write IOPs for which write data is cached in the write cache of the data storage system. In the embodiment of FIG. 3, increasing the percentage of write IOPs for which write caching is performed is achieved by transitioning the write cache from the OFF state to the ON state. In other embodiments, such as that depicted in FIG. 4, this step can be performed by transitioning the write cache, for example, from the OFF state to the ON state, from the DRAIN state to the SELECTIVE state, or from the SELECTIVE state to the ON state.

While the present invention has been particularly shown as described with reference to one or more preferred embodiments, it will be understood by those skilled in the art that various changes in form and detail may be made therein without departing from the spirit and scope of the invention. For example, although aspects have been described with respect to a computer system executing program code that directs the functions of the present invention, it should be understood that present invention may alternatively be implemented as a program product including a storage device (e.g., memory, magnetic disk, DVD, CD-ROM, etc.) storing program code that can be processed by a processor to direct the described functions.

What is claimed is:

1. A method of cache management in a data storage system including a write cache and bulk storage media, the method comprising:
   a storage controller of the data storage system caching, in the write cache, write data of write input/output operations (IOPs) received at the storage controller;
   in response to a first performance-related metric for the data storage system satisfying a first threshold, the storage controller decreasing a percentage of write IOPs for which write data is cached in the write cache of the data storage system and increasing a percentage of write IOPs for which write data is stored directly in the bulk storage media in lieu of the write cache; and
   thereafter, in response to a second performance-related metric for the data storage system satisfying a second threshold, the storage controller increasing the percentage of write IOPs for which write data is cached in the write cache of the data storage system, wherein the second performance-related metric is computed based on a rate of receipt of write IOPs by the storage controller.

2. The method of claim 1, wherein decreasing a percentage of write IOPs for which write data is cached in the write cache comprises refraining from caching write data of write IOPs in the write cache and instead storing the write data of write IOPs directly in the bulk storage media.

3. The method of claim 1, and further comprising:
   in response to the first performance-related metric satisfying the first threshold, draining write data held in the write cache to the bulk storage media.

4. The method of claim 3, wherein:
   the draining includes draining the write cache to a fill level greater than empty; and
   the storage controller, responsive to reaching the fill level, performs the increasing of the percentage of write IOPs for which write data is cached in response to the second performance threshold being satisfied.

5. The method of claim 4, wherein the increasing of the percentage of write IOPs for which write data is cached comprises caching write data in the write cache for less than all write IOPs received by the storage controller.

6. The method of claim 1, wherein:
   the bulk storage media includes non-volatile memory; and
   said increasing a percentage of write IOPs for which write data is stored directly in the bulk storage media in lieu of the write cache includes increasing the percentage of write IOPs for which write data is stored directly in the non-volatile memory.

7. The method of claim 1, and further comprising computing the first performance-related metric based on one or more of a rate of receipt of write IOPs by the storage controller, an average response time to IOPs by the storage controller, and a utilization of processing capacity of the storage controller.

8. A storage controller for a data storage system including a write cache and bulk storage media, the storage controller comprising:
   a processor; and
   memory coupled to the processor, wherein the memory includes program code that when processed by the processor, causes the storage controller to:
      cache, in the write cache, write data of write input/output operations (IOPs) received at the storage controller;
      in response to a first performance-related metric for the data storage system satisfying a first threshold, decrease a percentage of write IOPs for which write data is cached in the write cache of the data storage system and increase a percentage of write IOPs for which write data is stored directly in the bulk storage media in lieu of the write cache; and
      thereafter, in response to a second performance-related metric for the data storage system satisfying a second threshold, increase the percentage of write IOPs for which write data is cached in the write cache of the data storage system, wherein the second performance-related metric is computed based on a rate of receipt of write IOPs by the storage controller.

9. The storage controller of claim 8, wherein the program code, when executed by the processor, causes the storage controller to decrease a percentage of write IOPs for which write data is cached in the write cache by refraining from caching write data of write IOPs in the write cache and instead store the write data of write IOPs directly in the bulk storage media.

10. The storage controller of claim 8, wherein the program code, when processed by the processor, causes the storage controller to:
    in response to the first performance-related metric satisfying the first threshold, drain write data held in the write cache to the bulk storage media.

11. The storage controller of claim 10, wherein:
    the program code, when executed by the processor, causes the storage controller to drain the write cache to a fill level greater than empty; and
    the program code, when executed by the processor, causes the storage controller, responsive to reaching the fill level, to increase the percentage of write IOPs for which write data is cached in response to the second performance threshold being satisfied.

12. The storage controller of claim 11, wherein the program code, when executed by the processor, causes the storage controller to cache write data in the write cache for less than all write IOPs received by the storage controller.

13. A data storage system, comprising:
    the storage controller of claim 8; and
    the bulk storage media.

14. The data storage system of claim 13, wherein the bulk storage media comprises non-volatile memory.

15. The storage controller of claim 8, wherein the first performance-related metric is computed based on one or more of a rate of receipt of write IOPs by the storage controller, an average response time to IOPs by the storage controller, and a utilization of processing capacity of the storage controller.

16. A program product for a storage controller for a data storage system including a write cache and bulk storage media, the program product comprising:
    a data storage device; and program code stored within the data storage device, that when processed by a storage controller, causes the storage controller to:
- cache, in the write cache, write data of write input/output operations (IOPs) received at the storage controller;
- in response to a first performance-related metric for the data storage system satisfying a first threshold, decrease a percentage of write IOPs for which write data is cached in the write cache of the data storage system and increase a percentage of write IOPs for which write data is stored directly in the bulk storage media in lieu of the write cache; and
- thereafter, in response to a second performance-related metric for the data storage system satisfying a second threshold, increase the percentage of write IOPs for which write data is cached in the write cache of the data storage system, wherein the second performance-related metric is computed based on a rate of receipt of write IOPs by the storage controller.

17. The program product of claim 16, wherein the program code, when executed by the storage controller, causes the storage controller to decrease a percentage of write IOPs for which write data is cached in the write cache by refraining from caching write data of write IOPs in the write cache and instead store the write data of write IOPs directly in the bulk storage media.

18. The program product of claim 16, wherein the program code, when processed by the storage controller, causes the storage controller to:
- in response to the first performance-related metric satisfying the first threshold, drain write data held in the write cache to the bulk storage media.

* * * * *